US011084896B2

(12) United States Patent
Satou et al.

(10) Patent No.: US 11,084,896 B2
(45) Date of Patent: Aug. 10, 2021

(54) ACRYLIC POLYMER, PLASTISOL, AND TEXTILE INK

(71) Applicant: Mitsubishi Chemical Corporation, Chiyoda-ku (JP)

(72) Inventors: Eriko Satou, Tokyo (JP); Toru Kondo, Tokyo (JP); Saki Fujita, Tokyo (JP); Yuuta Maenaka, Tokyo (JP)

(73) Assignee: Mitsubishi Chemical Corporation, Chiyoda-ku (JP)

(*) Notice: Subject to any disclaimer, the term of this patent is extended or adjusted under 35 U.S.C. 154(b) by 0 days.

(21) Appl. No.: 16/735,791

(22) Filed: Jan. 7, 2020

(65) Prior Publication Data

US 2020/0140589 A1 May 7, 2020

Related U.S. Application Data

(63) Continuation of application No. PCT/JP2018/020728, filed on May 30, 2018.

(30) Foreign Application Priority Data

Jul. 26, 2017 (JP) ............................ JP2017-144572

(51) Int. Cl.

| | |
|---|---|
| ***C08F 220/14*** | (2006.01) |
| ***C08J 3/18*** | (2006.01) |
| ***C09D 11/107*** | (2014.01) |
| ***C08F 14/06*** | (2006.01) |
| ***C08F 220/32*** | (2006.01) |
| ***C08F 228/02*** | (2006.01) |
| ***C08F 236/20*** | (2006.01) |
| ***C08J 3/12*** | (2006.01) |
| ***C08K 5/00*** | (2006.01) |
| ***D06P 1/52*** | (2006.01) |
| *C08F 220/18* | (2006.01) |
| *C08F 220/30* | (2006.01) |

(52) U.S. Cl.

CPC ............ *C08F 220/14* (2013.01); *C08F 14/06* (2013.01); *C08F 220/32* (2013.01); *C08F 228/02* (2013.01); *C08F 236/20* (2013.01); *C08J 3/12* (2013.01); *C08K 5/0016* (2013.01); *D06P 1/5228* (2013.01); *D06P 1/5235* (2013.01); *C08F 220/1808* (2020.02); *C08F 220/308* (2020.02)

(58) Field of Classification Search

None

See application file for complete search history.

(56) References Cited

U.S. PATENT DOCUMENTS

| | | | | |
|---|---|---|---|---|
| 5,137,979 | A | 8/1992 | Maeda et al. | |
| 2014/0350186 | A1 | 11/2014 | Hatae et al. | |
| 2015/0240014 | A1 | 8/2015 | Hara et al. | |
| 2017/0190822 | A1* | 7/2017 | Hara | B32B 27/08 |

FOREIGN PATENT DOCUMENTS

| | | | |
|---|---|---|---|
| CN | 104736610 | A | 6/2015 |
| CN | 106459317 | A | 2/2017 |
| EP | 2 518 093 | A1 | 10/2012 |
| EP | 2 894 189 | A1 | 7/2015 |
| EP | 3 144 328 | A1 | 3/2017 |
| JP | 63-178116 | A | 7/1988 |
| JP | 9-296011 | A | 11/1997 |
| JP | 2008-280441 | A | 11/2008 |
| JP | 2013-28813 | A | 2/2013 |
| JP | 5297724 | B2 | 9/2013 |
| JP | 2015-224268 | A | 12/2015 |
| WO | WO 2011/078380 | A1 | 6/2011 |

OTHER PUBLICATIONS

Machine-generated English-language translation of JP2009074087A to Funaki.*

Extended European Search Report dated May 29, 2020 in European Patent Application No. 18838292.3, citing documents AA-AC and AO-AP therein, 8 pages.

International Search Report dated Aug. 7, 2018 in PCT/JP2018/020728 filed May 30, 2018 (with English Translation), citing documents AA, AO and AQ-AU therein, 4 pages.

Office Action dated Apr. 27, 2021, in corresponding Chinese Patent Application No. 201880047001.8, (with English translation).

Office Action dated May 3, 2021, in corresponding European Patent Application No. 18 836 292.3.

* cited by examiner

*Primary Examiner* — Vu A Nguyen

(74) *Attorney, Agent, or Firm* — Oblon, McClelland, Maier & Neustadt, L.L.P.

(57) ABSTRACT

There are provided an acrylic polymer and plastisol using which a textile ink having excellent washing resistance and crocking resistance can be produced and a textile ink having excellent washing resistance and crocking resistance. The acrylic polymer of the present invention is an acrylic polymer comprising an acetone-soluble portion (A) and an acetone-insoluble portion (B), and the content of the acetone-insoluble portion (B) in the acrylic polymer is 5 mass % to 29 mass %, and the content of methyl methacrylate units in the acetone-soluble portion (A) is 60 mass % to 85 mass %.

4 Claims, No Drawings

ACRYLIC POLYMER, PLASTISOL, AND TEXTILE INK

This application is a continuation application of International Application No. PCT/JP2018/020728, filed on May 30, 2018, which claims the benefit of priority of the prior Japanese Patent Application No. 2017-144572, filed Jul. 26, 2017, the content of which is incorporated herein by reference.

TECHNICAL FIELD

The present invention relates to an acrylic polymer, a plastisol, and a textile ink.

BACKGROUND ART

In the related art, textile inks have been used as a material for printing letters, patterns, and the like on fabrics such as T-shirts. Textile inks contain functional components such as a plastisol and a pigment, and a coating printed using the same is required to have characteristics such as washing resistance and crocking resistance in addition to strength and mechanical conformability with respect to the fabric.

A polyvinyl chloride plastisol, an acrylic resin plastisol or the like is used as the plastisol contained in such a textile ink A coating using a polyvinyl chloride plastisol has excellent strength, mechanical conformability with respect to cloth, and washing resistance, but may cause environmental problems such as dioxin generation when it is incinerated at a low temperature. Therefore, textile inks using an acrylic resin plastisol with low environmental loads have been proposed. However, textile inks containing an acrylic resin plastisol have physical properties such as insufficient washing resistance and insufficient crocking resistance.

For example, Patent Literature 1 discloses that washing resistance and crocking resistance are improved when a textile ink in which a blocked isocyanate and a curing agent are added to an acrylic resin plastisol is used.

In addition, Patent Literature 2 describes that, in a molded article obtained by molding an acrylic polymer having monomer units that impart a glass transition temperature of 0° C. or lower when they are made into a homopolymer, an acrylic resin composition has a low environmental load and excellent flexibility, but none of physical properties such as washing resistance and crocking resistance is sufficient.

CITATION LIST

Patent Literature

[Patent Literature 1]

Japanese Unexamined Patent Application, First Publication No. 2015-224268

[Patent Literature 2]

Japanese Unexamined Patent Application, First Publication No. 2008-280441

SUMMARY OF INVENTION

Technical Problem

However, in the coating of the textile ink using the plastisol in Patent Literature 1, no improvement in washing resistance or crocking resistance due to baking conditions for the coating is observed.

In addition, the acrylic resin composition described in Patent Literature 2 has excellent flexibility as a material for automobile components, electrical and electronic components, and the like, but there is no description of it being used as a textile ink. In addition, when it is made into a plastisol, no washing resistance and crocking resistance are exhibited.

Solution to Problem

The present invention provides the following aspects.

[1] An acrylic polymer including an acetone-soluble portion (A) and an acetone-insoluble portion (B), wherein the content of the acetone-insoluble portion (B) in the acrylic polymer is 5 mass % to 29 mass %, and wherein the content of methyl methacrylate units in the acetone-soluble portion (A) is 60 mass % to 85 mass %.

[2] The acrylic polymer according to [1], wherein the content of alkyl (meth)acrylate units having an alkyl group having 2 to 8 carbon atoms in the acetone-insoluble portion (B) is 15 mass % to 90 mass %.

[3] The acrylic polymer according to [1] or [2], including dimethacrylate units having an alkyl group having 6 or less carbon atoms.

[4] The acrylic polymer according to any one of [1] to [3], wherein the acrylic polymer is acrylic polymer fine particles, and the volume average particle size of the acrylic polymer fine particles is 300 nm or more.

[5] A plastisol including the acrylic polymer according to any one of [1] to [4] and a plasticizer.

[6] A textile ink including the plastisol according to [5].

Advantageous Effects of Invention

A coating obtained from a plastisol produced using the acrylic polymer of the present invention has excellent flexibility and when the acrylic polymer of the present invention is used, a textile ink having excellent washing resistance and crocking resistance can be produced.

A coating obtained from the plastisol of the present invention has excellent flexibility and when the plastisol of the present invention is used, a textile ink having excellent washing resistance and crocking resistance can be produced.

The textile ink of the present invention has excellent washing resistance and crocking resistance.

DESCRIPTION OF EMBODIMENTS

Acrylic Polymer

An acrylic polymer of the present invention includes an acetone-soluble portion (A) and an acetone-insoluble portion (B).

The content of the acetone-insoluble portion (B) in the acrylic polymer is 5 mass % to 29 mass %, and the content of methyl methacrylate units in the acetone-soluble portion (A) is 60 mass % to 85 mass %.

(Acetone-insoluble portion (B))

The acrylic polymer of the present invention includes 5 mass % to 29 mass % of the acetone-insoluble portion (B), and the content of the acetone-insoluble portion (B) in the acrylic polymer is preferably 8 mass % to 26 mass %.

If the content of the acetone-insoluble portion (B) in the acrylic polymer is within the above range, when the acrylic polymer is used to form a coating, a plasticizer retention property, washing resistance, and sol storage stability are easily improved. Here, the acetone-insoluble portion (B) is an insoluble component obtained by sufficiently dissolving an acrylic polymer in acetone and separating insoluble components from soluble components using a centrifuge.

In addition, in the acrylic polymer of the present invention, the content of alkyl (meth)acrylate units having an alkyl group having 2 to 8 carbon atoms in the acetone-insoluble portion (B) is preferably 15 mass % to 90 mass %.

If the content of alkyl (meth)acrylate units having an alkyl group having 2 to 8 carbon atoms (hereinafter referred to as a "C2 to C8 acrylic monomer unit") in the acetone-insoluble portion (B) is within the above range, a plasticizer retention property and washing resistance of the coating using an acrylic polymer are easily improved.

In addition, the acrylic polymer of the present invention preferably includes dimethacrylate units having an alkyl group having 6 or less carbon atoms.

When dimethacrylate units having an alkyl group having 6 or less carbon atoms are included, a plasticizer retention property and washing resistance of the coating using an acrylic polymer are easily improved.

(Acetone-soluble portion (A))

In the acrylic polymer of the present invention, acetone-soluble portion (A) includes 60 mass % to 85 mass % of methyl methacrylate units. The content of methyl methacrylate units in the acetone-soluble portion (A) is preferably 65 mass % to 80 mass %.

If the content of methyl methacrylate units in the acetone-soluble portion (A) is within the above range, the sol storage stability is easily improved, the strength of the coating is easily improved, crocking resistance is easily improved, and the degree of plasticization of the coating is improved so that a coating having favorable flexibility and washing resistance is easily obtained.

Here, the acetone-soluble portion (A) is a soluble component obtained by sufficiently dissolving an acrylic polymer in acetone and separating insoluble components from soluble components using a centrifuge.

Units other than methyl methacrylate included in the acetone-soluble portion (A) and the acetone-insoluble portion (B) of the acrylic polymer of the present invention may be any monomer unit copolymerizable with methyl methacrylate, and examples thereof include alkyl (meth)acrylate units such as methyl acrylate. Specific examples of alkyl (meth)acrylate units include (meth)acrylate units of linear alkyl alcohols such as methyl acrylate, ethyl acrylate, n-butyl (meth)acrylate, i-butyl (meth)acrylate, t-butyl (meth)acrylate, hexyl (meth)acrylate, 2-ethylhexyl (meth) acrylate, and octyl (meth)acrylate; and (meth)acrylates of cyclic alkyl alcohols such as cyclohexyl (meth)acrylate; and the like. Among these, methyl acrylate, n-butyl (meth) acrylate, i-butyl (meth)acrylate, t-butyl (meth)acrylate, and 2-ethylhexyl (meth)acrylate are preferable in consideration of industrial applications because they are readily available.

Here, (meth)acrylate means either or both of acrylate and methacrylate.

In addition to the above units, the acrylic polymer of the present invention may include a monomer unit having various functional groups as necessary. Specific examples of such a monomer unit include (meth)acrylate units having a carbonyl group such as acetoacetoxyethyl (meth)acrylate; (meth)acrylate units having a hydroxyl group such as 2-hydroxyethyl (meth)acrylate and 2-hydroxypropyl (meth)acrylate; (meth)acrylate units having an epoxy group such as glycidyl (meth)acrylate; (meth)acrylate units having an amino group such as N-dimethylaminoethyl (meth)acrylate, and N-di ethylaminoethyl (meth)acrylate; (meth)acrylamides such as acrylamide, diacetoneacrylamide, N-methylolacrylamide, N-methoxymethylacrylamide, N-ethoxymethylacrylamide, and N-butoxymethylacrylamide and their derivative units; urethane-modified (meth)acrylate units; epoxy-modified (meth)acrylate units;

silicone-modified (meth)acrylate units; and the like.

Method of Producing an Acrylic Polymer

The acrylic polymer of the present invention can be produced according to a production method including a process (1) in which monomers with less than a critical micelle concentration are polymerized to form seed particles and a process (2) in which desired monomers are added and polymerized in the presence of the obtained seed particles. When desired monomers are added and polymerized, addition and polymerization of monomers can be repeated a plurality of times as necessary. For example, the process (2) may include a process (2a) in which monomers including an alkyl (meth)acrylate having an alkyl group having 2 to 8 carbon atoms are added and polymerized in the presence of the obtained seed particles, a process (2b) in which monomers including methyl methacrylate, n-butyl methacrylate, and glycidyl methacrylate are added and polymerized, and a process (2c) in which monomers including methyl methacrylate and methacrylic acid are added and polymerized.

Here, the monomers used for either or both of the process (1) and the process (2a) preferably include dimethacrylate units having an alkyl group having 6 or less carbon atoms.

The process (1) is a process in which, under a condition less than a critical micelle concentration, an initiator is added to a dispersion medium in which acrylic monomers are dispersed as necessary, heating is appropriately performed as necessary, and soap-free polymerization is performed to obtain seed particles.

During polymerization, preferably, air in a polymerization system is purged with an inert gas such as nitrogen gas, and the oxygen concentration in the polymerization system is reduced. Specifically, the dissolved oxygen concentration in the dispersion medium is preferably 2 mg/L, and the gas phase oxygen concentration in the polymerization system is preferably 2% or less, and the gas phase oxygen concentration is particularly preferably 1% or less. When the oxygen concentration in the polymerization system is such reduced, polymerization inhibition due to oxygen is eliminated, and a high molecular weight acrylic polymer having a weight average molecular weight (Mw) of 500,000 or more is easily obtained.

The process (2a) is a process in which, in the presence of the seed particles obtained in the process (1), monomers including an alkyl (meth)acrylate having an alkyl group having 2 to 8 carbon atoms are added and polymerized.

Here, the monomers used for either or both of the process (1) and the process (2a) preferably include dimethacrylate units having an alkyl group having 6 or less carbon atoms.

In the process (2a), after the seed particles are obtained in the process (1), monomers may be added to the container and polymerized, and the seed particles may be prepared in advance in another batch, and the monomers may be added to the prepared seed particles and polymerized.

The process (2b) is a process in which monomers including methyl methacrylate, n-butyl methacrylate, and glycidyl methacrylate are added and polymerized after the process (2a).

In the process (2b), in the presence of a radical polymerization initiator, polymerization can be performed. The amount of the radical polymerization initiator used is preferably 0.005 parts by mass to 0.040 parts by mass and more preferably 0.01 parts by mass to 0.035 parts by mass with respect to 100 parts by mass of monomers. Regarding a method of supplying a radical polymerization initiator, it is preferable to supply monomers in which a radical polymerization initiator is dissolved by dropwise addition.

The radical polymerization initiator is not particularly limited, and examples thereof include the following initiators.

Oil-soluble azo polymerization initiators: 2,2'-azobisisobutyronitrile, 1,1'-azobiscyclohexane-1-carbonitrile, 2,2'-azobis-4-methoxy-2,4-dimethylvaleronitrile, 2,2'-azobis-2,4-dimethylvaleronitrile, dimethyl-2,2'-azobis(2-methylpropionate), 1,1'-azobis(1-acetoxy-1-phenylethane), 2,2'-azobis(4-methoxy-2,4-dimethylvaleronitrile), and the like Water-soluble azo polymerization initiators: azobisamidinopropane salt, azobiscyanovaleric acid (salt), 2,2'-azobis [2-methyl-N-(2-hydroxyethyl)propionamide], and the like Peroxide polymerization initiators: benzoyl peroxide, and the like Among these, an oil-soluble azo radical polymerization initiator is preferable. Among these, 2,2'-azobisisobutyronitrile, 2,2'-azobis-2,4-dimethylvaleronitrile is preferable.

The process (2c) is a process in which monomers including methyl methacrylate and methacrylic acid are added and polymerized after the process (2b).

After the process (2b), before monomers are supplied in the process (2c), it is preferable to perform either or both of addition of a chain transfer agent and additional addition of a radical polymerization initiator.

The chain transfer agent is not particularly limited as long as it is a known chain transfer agent, and examples thereof include n-octyl mercaptan, n-dodecyl mercaptan, n-lauryl mercaptan, tert-dodecyl mercaptan, octyl thioglycolate, methoxybutyl thioglycolate, and tridecyl mercaptopropionate.

The amount of the chain transfer agent used is not particularly limited, and is preferably 0.05 parts by mass or more with respect to 100 parts by mass of monomers supplied in the process (2c) because then the film tends to be flexible. In addition, the amount is preferably 3 parts by mass or less and more preferably 1.5 parts by mass or less with respect to 100 parts by mass of monomers supplied in the process (2c) because then storage stability tends to be favorable.

For example, the amount of the chain transfer agent used is preferably 0.05 parts by mass to 3 parts by mass and more preferably 0.05 parts by mass to 1.5 parts by mass with respect to 100 parts by mass of monomers supplied in the process (2c).

Preferable examples of radical polymerization initiators additionally added include water-soluble peroxides such as hydrogen peroxide and persulfate, and redox systems of peroxide and a reducing agent. Among these, a water-soluble peroxide is preferably used, and among these, persulfates such as potassium persulfate, ammonium persulfate, and sodium persulfate are particularly preferably used.

Examples of a method of additionally adding a radical polymerization initiator include a method of directly adding powder and a method of performing dissolving in water and adding. In order to minimize generation of aggregates, a method of performing dissolving in water and adding is preferable.

(Powder collection)

After the process (2) in which desired monomers are added and polymerized in the presence of the seed particles obtained in the process (1) is completed, a spray drying method can be used as a method of collecting polymer powder from a polymer dispersion solution.

In order to improve dispersibility, collection using a spray drying method is preferable because it makes easy to create a state in which primary particles are not firmly bonded to each other but loosely aggregated in aggregated particles (secondary particles or a higher-order structure) in which a plurality of primary particles are aggregated.

Particles constituting the polymer powder may be any of primary particles containing a polymer; secondary particles such as particles in which primary particles are aggregated with a cohesive force and particles fused to each other due to heat; and particles having a higher-order structure obtained by performing a treatment such as granulation on these secondary particles. Acrylic polymer particles can be made to have a higher-order structure according to use applications and requirements such as inhibition of powder collection from acrylic polymer particles, improving workability such as improvement in fluidity, and improving physical properties such as inhibition of gelling for a plasticizer in an acrylic resin plastisol.

The acrylic polymer of the present invention is preferably acrylic polymer fine particles. In addition, the volume average particle size of the acrylic polymer fine particles of the present invention is preferably 300 nm or more, more preferably 400 nm or more, and most preferably 500 nm or more.

If the volume average particle size of acrylic polymer fine particles of the present invention is within the above range, the initial viscosity when they are made into an acrylic resin plastisol tends to be lowered and storage stability tends to be favorable.

In the present invention, the volume average particle size can be determined by measuring the volume average primary particle size in a water dispersion solution containing polymer particles prepared so that the transmittance is in a range of 75 to 95% using a laser diffraction/scattering particle size distribution measurement device (product name: LA-960 commercially available from Horiba Ltd.).

Plastisol

A plastisol of the present invention includes the acrylic polymer of the present invention and a plasticizer.

(Plasticizer)

The plasticizer included in the plastisol of the present invention is not particularly limited as long as it has an ability to plasticize an acrylic polymer, and examples thereof include phthalate plasticizers such as dimethyl phthalate, diethyl phthalate, dibutyl phthalate, diheptyl phthalate, di-2-ethylhexyl phthalate, di-n-octyl phthalate, diisononyl phthalate, diisodecyl phthalate, and butyl benzyl phthalate; adipate plasticizers such as dimethyl adipate, dibutyl adipate, diisobutyl adipate, dihexyl adipate, di-2-ethylhexyl adipate, diisononyl adipate, and dibutyl diglycol adipate; phosphate plasticizers such as tri methyl phosphate, triethyl phosphate, tributyl phosphate, tri-2-ethylhexyl phosphate, tributoxyethyl phosphate, triphenyl phosphate, tricresyl phosphate, trixylenyl phosphate, and cresyl diphenyl phosphate; trimellitate plasticizers such as tri-2-ethylhexyl trimellitate; sebacate plasticizers such as dimethyl sebacate, dibutyl sebacate, and di-2-ethylhexyl sebacate; aliphatic polyester plasticizers such as poly-1,3-butanediol adipate; epoxidized ester plasticizers such as epoxidized soybean oil; alkylsulfonic acid phenyl ester plasticizers such as alkylsulfonic acid phenyl ester; alicyclic dibasic acid ester plasticizers; polyether plasticizers such as polypropylene glycol and polybutylene glycol; and citrate esters such as acetyltriethyl citrate and acetyltributyl citrate.

The plasticizers may be used alone or two or more thereof may be used in combination.

The content of the plasticizer in the plastisol is preferably 50 parts by mass or more and more preferably 70 parts by mass or more with respect to 100 parts by mass of acrylic polymers because then the obtained coating can easily be made flexible. In addition, the content is preferably 400 parts by mass or less and more preferably 300 parts by mass or less with respect to 100 parts by mass of acrylic polymers because then it is easy to reduce bleeding out in the obtained coating and molded product.

Specifically, for example, the content of the plasticizer in the plastisol is preferably 50 parts by mass to 400 parts by mass and more preferably 70 parts by mass to 300 parts by mass with respect to 100 parts by mass of acrylic polymers.

Examples of a method of preparing the above plastisol include a method of mixing an acrylic polymer and a plasticizer at a predetermined ratio and stirring them.

(Additives)

Additives can be added to the plastisol of the present invention as long as properties thereof are not impaired.

Examples of additives include natural inorganic pigments such as clay, barite, mica, and yellow soil; synthetic inorganic pigments such as titanium oxide, zinc yellow, barium sulfate, zinc oxide, aluminum hydroxide, calcium carbonate, magnesium carbonate, and carbon black; metal powders such as aluminum powder and zinc powder; natural dye pigments such as madder lake; nitroso-based, azo-based, phthalocyanine-based, basic dye-based, and organic fluorescence-based synthetic organic pigments, and mineral fillers; fume silica, glass spheres, hollow spheres, fiber glass, titanium oxide (titanium oxide is particularly preferable because concealment when a plastisol is used as an ink is improved), synthetic fillers; plastic spheres and plant filling materials; and fillers such as wood flour, nut shells, and cellulose fibers.

In addition, as necessary, viscosity control agents such as a thixotropic agent, a thickener, and a viscosity reducing agent; hygroscopic agents such as a dispersant and calcium oxide; an antioxidant, a foaming agent, and a diluent can be added.

Textile Ink

The textile ink of the present invention includes the plastisol of the present invention.

In addition, the textile ink of the present invention includes the acrylic polymer of the present invention.

The textile ink of the present invention is obtained by mixing the acrylic polymer of the present invention, a plasticizer, and a pigment. In addition, as necessary, the above additives may be added.

For a mixing method, a general stirrer such as a dissolver, a kneader, and a planetary mixer can be used.

In order to obtain a textile ink having a formulation with a favorable dispersion state, less mesh clogging, and favorable screen printing properties, a 3-roller mill can be used in addition to use of the stirrer.

A fabric to which a textile ink is applied may be any of a woven fabric, a knitted fabric, a felt, a non-woven fabric, a leather, and an artificial leather. Examples of raw yarns forming such a fabric include natural fibers such as cotton, silk hemp, and wool; recycled fibers such as acetate and rayon; and synthetic fibers such as nylon, polyester, and polyurethane.

After a textile ink is applied to the fabric using a method such as screen printing, heating is performed, and thus heating and compression are performed to form a coating. Heating conditions may be appropriately set depending on the thickness of the coated film, the blending composition, oven characteristics, and the like, and are generally, for example, 100 to 250° C. and 1 second to 10 minutes.

EXAMPLES

While the present invention will be described below in more details with reference to examples and comparative examples, the present invention is not limited to the following descriptions.

Example 1

(Synthesis of polymer)

544 g of pure water was put into a 2 L 4-neck flask including a thermometer, a nitrogen gas inlet pipe, a stirring bar, a dripping funnel and a cooling pipe, and sufficient nitrogen gas was passed through for 60 minutes to replace oxygen dissolved in pure water. The nitrogen gas was ongoingly introduced into the flask, monomers (methyl methacrylate 26.1 g, n-butyl methacrylate 19.9 g) shown in the initial addition M1 in Table 1 were added, and the temperature was raised to 80° C. while stirring at 180 rpm. When the internal temperature reached 80° C., 0.4 g of potassium persulfate dissolved in 16 g of pure water was added at one time and soap-free polymerization started. Stirring continued without change at 80° C. for 60 minutes to obtain a seed particle dispersion solution.

Subsequently, an emulsion (obtained by mixing monomers (n-butyl methacrylate 40 g, 1,3-butanediol dimethacrylate 0.7 g) shown in the monomers M2 in Table 1, 0.4 g of sodium dialkylsulfosuccinate ("Pelex OT-P" commercially available from Kao Corporation), and 20 g of pure water, and stirring and emulsifying them) of monomers shown in the monomers M2 in Table 1 was added dropwise to the seed particle dispersion solution over 15 minutes, and then stirring continued at 80° C. for 30 minutes to obtain a second dropwise addition polymer dispersion solution.

Then, an emulsion (obtained by mixing monomers (methyl methacrylate 323.4 g, n-butyl methacrylate 196.6 g, glycidyl methacrylate 3.7 g) shown in the monomers M3 in Table 1, 3.7 g of sodium dialkylsulfosuccinate ("Pelex OT-P" commercially available from Kao Corporation), 0.2 g of 2,2'-azobisisobutyronitrile, and 260 g of pure water, and stirring and emulsifying them) of monomers shown in the monomers M3 in Table 1 was added dropwise to the second dropwise addition polymer dispersion solution over 2 hours and 45 minutes, and then stirring continued at 80° C. for 30 minutes to obtain a third dropwise addition polymer dispersion solution.

Then, 1.6 g of potassium persulfate dissolved in 40 g of pure water was added to the third dropwise addition polymer dispersion solution, and additionally, an emulsion (obtained by mixing monomers (methyl methacrylate 219.1 g, methacrylic acid 20.9 g) shown in the monomers M4 in Table 1, 0.88 g of 2-ethylhexyl thioglycolate (commercially available from Yodo Kagaku Co., Ltd.), 2.4 g of sodium dialkylsulfosuccinate ("Pelex OT-P" commercially available from Kao Corporation), and 120 g of pure water, and stirring and emulsifying them) of monomers shown in the monomers M4 in Table 1 was added dropwise thereto over 1 hour and 30 minutes, and then stirring continued at 80° C. for 45 minutes to obtain a fourth dropwise addition polymer dispersion solution.

The obtained fourth dropwise addition polymer dispersion solution was cooled to room temperature and spray drying was then performed using a spray dryer (L-8i type commercially available from Ohkawara Kakohki Co., Ltd.) at an inlet temperature of 150° C., an outlet temperature of 65° C., and an atomizer rotational speed of 20,000 rpm to obtain a polymer P1 (acrylic polymer).

(Preparation of plastisol composition)

100 parts by mass of Mesamoll (plasticizer: alkyl sulfonic acid phenyl ester, commercially available from LANXESS) and 100 parts by mass of the polymer P1 were put into a plastic container, and mixed and stirred using a vacuum mixer (product name: ARV-200, commercially available from Thinky Corporation) for 5 seconds at 1 atm, and the pressure was then reduced to 20 mmHg, and additionally, mixing and stirring were performed for 115 seconds for degassing to obtain a plastisol composition. The obtained plastisol composition was uniform.

(Preparation of textile ink)

120 parts by mass of Mesamoll (plasticizer: alkyl sulfonic acid phenyl ester, commercially available from LANXESS), 100 parts by mass of the polymer P1, and 50 parts by mass of JR-600A (pigment: titanium oxide, commercially available from Tayca Corp) were put into a plastic container, and mixed and stirred using a vacuum mixer (product name: ARV-200, commercially available from Thinky Corporation) for 5 seconds at 1 atm, and the pressure was then reduced to 20 mmHg, and additionally, mixing and stirring were performed for 115 seconds for degassing, and subsequently, a mixture was obtained by performing passing through each roller once at roller intervals (far:near)=20 μm:10 μm, 10 μm:5 μm, and 5 μm:5 μm using a 3-roller mill (product name: M-80E commercially available from EXAKT). 2.3 parts by mass of copper phthalocyanine (pigment: commercially available from Dainichiseika Color & Chemicals Mfg. Co., Ltd.) was added to 100 parts by mass of the obtained mixture, and mixing and stirring were performed using a vacuum mixer (product name: ARV-200, commercially available from Thinky Corporation) for 5 seconds at 1 atm, the pressure was then reduced to 20 mmHg, and additionally, mixing and stirring were performed for 115 seconds for degassing and mixing to obtain a textile ink. The obtained textile ink was uniform.

Examples 2 to 6, and Comparative Example 1

According to compositions shown in Table 1, polymers (polymers P2 to P7) were synthesized in the same manner as in Example 1. In addition, plastisol compositions and textile inks were prepared using the obtained polymers in the same manner as in Example 1.

Comparative Example 2

640 g of pure water was put into a 2 L 4-neck flask including a thermometer, a nitrogen gas inlet pipe, a stirring bar, a dripping funnel and a cooling pipe, and sufficient nitrogen gas was passed through for 60 minutes to replace oxygen dissolved in pure water. The nitrogen gas was ongoingly introduced into the flask, monomers (methyl methacrylate 26.1 g, n-butyl methacrylate 19.9 g) shown in the initial addition M1 in Table 1 were added, and the temperature was raised to 80° C. while stirring at 180 rpm. When the internal temperature reached 80° C., 0.4 g of potassium persulfate dissolved in 16 g of pure water was added at one time and soap-free polymerization started.

Stirring continued without change at 80° C. for 60 minutes to obtain a seed particle dispersion solution.

Subsequently, an emulsion (obtained by mixing monomers (methyl methacrylate 31.0 g, n-butyl acrylate 99.9 g, styrene 23.8 g, ethylene glycol dimethacrylate 5.3 g) shown in the monomers M2 in Table 1, 0.3 g of sodium dialkylsulfosuccinate ("Pelex OT-P" commercially available from Kao Corporation), 1.6 g of 2,2'-azobis(2,4-dimethylvaleronitrile), and 80 g of pure water, and stirring and emulsifying them) of monomers shown in the monomers M2 in Table 1 was added dropwise to the seed particle dispersion solution over 2 hours, and then stirring continued at 80° C. for 30 minutes to obtain a second dropwise addition polymer dispersion solution.

Then, an emulsion (obtained by mixing monomers (methyl methacrylate 181.4 g, n-butyl methacrylate 138.6 g) shown in the monomers M3 in Table 1, 0.6 g of sodium dialkylsulfosuccinate ("Pelex OT-P" commercially available from Kao Corporation), and 160 g of pure water and stirring and emulsifying them) of monomers shown in the monomers M3 in Table 1 was added dropwise to the second drop wise addition polymer dispersion solution over 2 hours, and then stirring continued at 80° C. for 30 minutes to obtain a third dropwise addition polymer dispersion solution.

Then, an emulsion (obtained by mixing monomers (methyl methacrylate 311.0 g, n-butyl acrylate 9.0 g) shown in the monomers M4 in Table 1, 0.6 g of 1-octanethiol (commercially available from Tokyo Chemical Industry Co., Ltd.), 0.6 g of sodium dialkylsulfosuccinate ("Pelex OT-P" commercially available from Kao Corporation), and 160 g of pure water, and stirring and emulsifying them) shown in the monomers M4 in Table 1 was added dropwise to the third dropwise addition polymer dispersion solution over 2 hours, and then stirring continued at 80° C. for 60 minutes to obtain a fourth dropwise addition polymer dispersion solution.

A polymer P8 (acrylic polymer) was obtained using the obtained fourth dropwise addition polymer dispersion solution in the same manner as in Example 1. In addition, a plastisol composition and a textile ink were prepared using the obtained polymer in the same manner as in Example 1.

TABLE 1

| | | Example | | | | | | Comparative Example | |
|---|---|---|---|---|---|---|---|---|---|
| Polymer | | 1<br>P1 | 2<br>P2 | 3<br>P3 | 4<br>P4 | 5<br>P5 | 6<br>P6 | 1<br>P7 | 2<br>P8 |
| Initial addition M1 (g) | MMA | 26.1 | 26.1 | 26.1 | 26.1 | 26.1 | 26.1 | 26.1 | 26.1 |
| | nBMA | 19.9 | 19.9 | 19.9 | 19.9 | 19.9 | 19.9 | 19.9 | 19.9 |
| | 1,3-BDMA | — | — | 0.8 | — | — | — | — | — |
| Monomers M2 (g) | nBMA | 40.0 | 14.0 | 14.0 | 40.0 | 80.0 | — | — | — |
| | MMA | — | 26.0 | 26.0 | — | — | — | — | 31.0 |
| | nBA | — | — | — | — | — | 40.0 | — | 99.9 |
| | 1,3-BDMA | 0.7 | 0.7 | — | 0.7 | 1.4 | 0.7 | — | — |
| | St | — | — | — | — | — | — | — | 23.8 |
| | EDMA | — | — | — | — | — | — | — | 5.3 |
| Monomers M3 (g) | MMA | 323.4 | 323.4 | 323.4 | 294.7 | 272.1 | 294.7 | 317.4 | 181.4 |
| | nBMA | 196.6 | 196.6 | 196.6 | 225.3 | 207.9 | 225.3 | 242.6 | 138.6 |
| | GMA | 3.7 | 3.7 | 3.7 | 3.7 | 3.4 | 3.7 | 4.0 | — |
| Monomers M4 (g) | MMA | 219.1 | 219.1 | 219.1 | 219.1 | 219.1 | 219.1 | 219.1 | 311.0 |
| | MAA | 20.9 | 20.9 | 20.9 | 20.9 | 20.9 | 20.9 | 20.9 | — |
| | nBA | — | — | — | — | — | — | — | 9.0 |

TABLE 1-continued

| Polymer | | Example 1 P1 | 2 P2 | 3 P3 | 4 P4 | 5 P5 | 6 P6 | Comparative Example 1 P7 | 2 P8 |
|---|---|---|---|---|---|---|---|---|---|
| Monomers M5 (g) | MAA | — | — | — | — | — | — | 3.1 | — |

Here, the symbols in the table have the following meanings.
MMA: methyl methacrylate (commercially available from Mitsubishi Chemical Corporation)
nBMA: n-butyl methacrylate (commercially available from Mitsubishi Chemical Corporation)
1,3-BDMA: 1,3-butanediol dimethacrylate (commercially available from Mitsubishi Chemical Corporation)
nBA: n-butyl acrylate (commercially available from Mitsubishi Chemical Corporation)
St: styrene (commercially available from Idemitsu Kosan Co., Ltd.)
EDMA: ethylene glycol dimethacrylate (commercially available from Mitsubishi Chemical Corporation)
GMA: glycidyl methacrylate (commercially available from Mitsubishi Chemical Corporation)
MAA: methacrylic acid (commercially available from Mitsubishi Chemical Corporation)

The polymers, plastisol compositions, and textile inks obtained in the above examples and comparative examples were subjected to the following evaluations.

The results are shown in Table 2 to Table 4.

(Measurement and calculation of proportion (gel content) of acetone-insoluble portion of polymer)

The gel content indicating a proportion of the acetone-insoluble portion of the acrylic polymer was measured according to the following method.

1.0 g of the polymer was precisely weighed out (the weight was [W0](g)) in a 50 ml sample bottle, and 40 ml of acetone was added thereto, and dispersed for one day or longer. Then, centrifugation was performed using a centrifuge (Hitachi high-speed cooling centrifuge (CR22N/CR21N), commercially available from Hitachi Koki Co., Ltd.) at a temperature of 2° C., and a rotational speed of 12,000 rpm for 60 minutes, a soluble component and an insoluble component were separated, 30 ml of acetone was added to the insoluble component again and dispersed, and centrifugation was performed using a centrifuge (Hitachi high-speed cooling centrifuge (CR22N/CR21N), commercially available from Hitachi Koki Co., Ltd.) at a temperature of 2° C. and a rotational speed of 12,000 rpm for 60 minutes, and the component was completely separated into a soluble component and an insoluble component. After the centrifugation, the insoluble component was heated in an oven under a nitrogen atmosphere to 60° C., acetone was removed, vacuum drying was performed at 60° C., the insoluble component was weighed out (the weight was [W1](g)), and based on the result, a proportion of the acetone-insoluble portion, that is, a gel content, was determined from the following formula.

$$\text{Gel content}=[W1]/[W0]\times 100$$

(Composition of monomer unit and structural unit of acetone-soluble portion of polymer)

The above soluble component was re-precipitated in about 400 ml of hexane, and the re-precipitated polymer was collected by filtration, and vacuum-dried at 60° C. to obtain an acetone-soluble portion of the polymer. In addition, the weight of the acetone-soluble portion was measured.

NMR measurement was performed on the acetone-soluble portion and the composition of the monomer unit and the structural unit was confirmed.

Measurement device

Nuclear magnetic resonance spectrometer UNITYINOVA500 commercially available from Varian Measurement conditions Acetone-soluble portion: 20 to 25 mg Solvent: deuterated chloroform 650 μL Measurement temperature: 40° C.

Cumulative number of measurements: 128

Nuclide: 1H (Composition of monomer unit and structural unit of acetone-insoluble portion)

Pyrolysis GC/MS measurement was performed on the acetone-insoluble portion, and the composition of the monomer unit and the structural unit was confirmed.

Measurement device

GC system (GC/MS GC-7890A, MSD-5975C commercially available from Agilent)

GCMS pyrolysis analysis system (EGA/PY-2020D commercially available from Frontier Laboratories Ltd.)

Measurement conditions

Pyrolyzer decomposition furnace temperature: 500° C.

Pyrolyzer injection temperature: 300° C.

Column: UA-5 commercially available from Frontier Laboratories Ltd. (length 30 m, inner diameter 0.25 mm, film thickness 0.25 μm)

Carrier gas: helium (1 mL/min)

Detector: MSD

Ionization method: EI

Oven temperature: 40° C. (hold for 5 minutes) to (the temperature raised at 20° C./min) to 300° C. (with no hold)

Inlet temperature: 280° C.

Transfer temperature: 300° C.

Mass spectral range: 20 to 800

Split ratio: 50:1

Injection amount: 50 μg to 200 μg

Data in pyrolysis GC/MS measurement was processed according to the following procedures.

For detected methyl methacrylate, a peak area value that appeared from a retention time of 3 minutes to 5 minutes for single ion 69 was calculated, and for alkyl (meth)acrylate units having an alkyl group having 2 to 8 carbon atoms, a peak area that appeared from a retention time of 7 minutes to 10 minutes was calculated with a specific ion value such as single ion 69 or 55. Digitalization in units of methyl methacrylate was performed. In order to determine the composition, using the polymer P7 and (meth)acrylic polymer particles CSP-3 described in Japanese Unexamined Patent Application, First Publication No. 2010-280761 as reference products, after calculation of a peak area value for single ion 69 for methyl methacrylate, and a peak area for single ion 69 or 55 for alkyl (meth)acrylate units having an alkyl group having 2 to 8 carbon atoms, in units of methacrylate, component composition calculation was performed.

The results are shown in Table 2.

TABLE 2

| | Polymer P1 | P2 | P3 | P4 | P5 | P6 | P7 | P8 |
|---|---|---|---|---|---|---|---|---|
| Proportion of acetone-insoluble portion (gel content) (%) | 8 | 24 | 14 | 10 | 26 | 19 | <1 | 34 |

TABLE 2-continued

| | Polymer | | | | | | | |
|---|---|---|---|---|---|---|---|---|
| | P1 | P2 | P3 | P4 | P5 | P6 | P7 | P8 |
| Proportion of C2 to C8 acrylic monomer units in acetone-insoluble portion (%) | 35 | 19 | 39 | 52 | 52 | 79 | * | 25 |
| Proportion of methyl methacrylate units in acetone-soluble portion (%) | 68 | 67 | 80 | 65 | 68 | 68 | 67 | 76 |

Here, in the table, "*" indicates that no acetone-insoluble portion was detected.

Storage stability of the obtained plastisol composition was evaluated according to the following method. In addition, a coating was formed using the obtained plastisol composition, and the strength, elongation, and elastic modulus were measured.

(Storage stability)

After the plastisol was left at 25° C. for 2 hours, the viscosity was measured at a measurement temperature of 25° C. and a rotational speed of 20 rpm using a Brookfield viscometer (BH type viscometer, No. 7 rotor, commercially available from Tokyo Keiki Co., Ltd.), and this was determined as the initial viscosity.

Then, the plastisol was kept warm in a thermostatic chamber at 40° C. and removed after 14 days, and the viscosity was measured again under the same conditions. This was determined as the viscosity after storage, and the viscosity increase rate S was calculated from the following formula.

$$S=[(\text{viscosity after storage/initial viscosity})-1]\times 100(\%)$$

Strength, elongation, and elastic modulus)

The plastisol was applied to an iron plate coated with Teflon (registered trademark) with a thickness of 2 mm, and heated at 130° C. for 30 minutes to obtain a uniform film.

The film peeled off from the iron plate was punched with a dumbbell type 2 (J1S K6251) to obtain a test piece.

This test piece was subjected to a tensile test using a tensile measuring device (Autograph AG-1S5kN, commercially available from Shimadzu Corporation) under conditions of a test temperature of 23° C. and a test speed of 50 mm/min, and the maximum point strength, the elongation at break, and the initial elastic modulus were measured. The results are shown in Table 3.

TABLE 3

| | | Example | | | | | | Comparative Example | |
|---|---|---|---|---|---|---|---|---|---|
| | | 1 | 2 | 3 | 4 | 5 | 6 | 1 | 2 |
| Plastisol physical properties | Initial viscosity (Pa · s) | 21 | 19 | 21 | 24 | 21 | 22 | 24 | 21 |
| | Storage stability (%) | 85 | 25 | 46 | 942 | G | G | 47 | G |
| Film physical properties | Strength (MPa) | 1.4 | 2.0 | 2.4 | 1.7 | 2.0 | 1.6 | 1.8 | 1.3 |
| | Elongation (%) | 428 | 388 | 452 | 413 | 444 | 549 | 384 | 351 |
| | Elastic modulus (MPa) | 4.3 | 3.0 | 5.2 | 3.0 | 3.7 | 4.4 | 6.1 | 1.0 |

In the table, "G" means gelling after storage. Here, gelling after storage means that storage stability was inferior to that of an example in which the viscosity after storage was able to be measured, but it does not necessarily mean that it did not have sufficient storage stability as a plastisol composition.

The washing resistance and color fastness of the obtained textile ink were evaluated according to the following methods.

Washing Resistance

A textile ink was screen-printed on a 100% cotton T-shirt with a size of 5 cm×10 cm using an 80 mesh screen.

Then, the textile ink was baked onto the T-shirt in a hot air dryer under conditions of 170° C.×10 minutes to obtain a test piece.

The test piece, 2 kg of a dummy 100% cotton T-shirt, and 30 g of a detergent (Tide (product name), commercially available from P&G US) were put into a professional washing machine (model: PW5065, commercially available from Miele), and a Normal/Cottons program, hot water at 60° C., and a rotational speed of 1,000 rpm were set and washing was performed.

Then, the test piece and the dummy T-shirt were removed and put into a professional dryer (model number: PT7136, commercially available from Miele), and dried.

The series of operations was set as 1 cycle, and this was performed 5 cycles. Whenever 1 cycle was completed, the sample was observed, and judged according to the following criteria.

A: No defect

B: Discoloration, peeling off, and cracking Color Fastness

A textile ink was screen-printed on a 100% cotton T-shirt with a size of 5 cm×10 cm using a 80 mesh screen.

Then, the textile ink was baked onto the T-shirt in a hot air dryer under conditions of 170° C.×10 minutes to obtain a test piece.

The test was performed using a friction testing machine I type according to the AATCC Crockmeter Method.

The contaminated white cloth was judged by comparison with the grayscale defined in JIS L0805. Here, the test conditions were set for two types: dry test and wet test.

Dry test: Test was performed with a dried white cloth

Wet test: Test was performed using a cloth soaked in water and in a about 100% wet state. After the test, judgement was performed for the white cloth dried at room temperature.

The evaluation results are shown in Table 4.

TABLE 4

| | | | Example | | | | | | Comparative Example | |
|---|---|---|---|---|---|---|---|---|---|---|
| | | | 1 | 2 | 3 | 4 | 5 | 6 | 1 | 2 |
| Washing resistance | Washing cycle | 1 | A | A | A | A | A | A | A | B |
| | | 2 | A | A | A | A | A | A | A | B |
| | | 3 | A | A | A | A | A | A | B | B |
| | | 4 | A | A | A | A | A | A | B | B |
| | | 5 | A | A | A | A | B | B | B | B |
| Color fastness (100% cotton) | Shirting | Dry | 4 | 4 | 4 | 4 | 4-5 | 4-5 | 4 | 4 |
| | | Wet | 5 | 5 | 5 | 5 | 5 | 5 | 5 | 5 |
| | Sample cloth | Dry | 5 | 5 | 5 | 5 | 5 | 5 | 5 | 5 |
| | | Wet | 5 | 5 | 5 | 5 | 5 | 5 | 5 | 5 |

As shown in Table 4, Examples 1 to 6 exhibited favorable washing resistance and crocking resistance. On the other hand, in Comparative Example 1, the textile ink was prepared from an acrylic polymer having less than 5 mass % of the acetone-insoluble portion, and in Comparative Example 2, the textile ink was prepared from an acrylic polymer having larger than 29 mass % of the acetone-insoluble portion, and their washing resistance was low.

Based on the above results, it can be clearly understood that the textile ink of the present invention produced using the plastisol of the present invention including the acrylic polymer of the present invention had excellent washing resistance and crocking resistance.

The invention claimed is:

1. An acrylic polymer comprising an acetone-soluble portion (A) and an acetone-insoluble portion (B), wherein the content of the acetone-insoluble portion (B) in the acrylic polymer is 8 mass % to 26 mass %, wherein the content of methyl (meth)acrylate units in the acetone-soluble portion (A) is 60 mass % to 85 mass %, wherein the content of alkyl (meth)acrylate units having an alkyl group having 2 to 8 carbon atoms in the acetone-insoluble portion (B) is 15 mass % to 90 mass %, and wherein the acrylic polymer comprises dimethacrylate units having an alkyl group having 6 or less carbon atoms.

2. The acrylic polymer according to claim 1, wherein the acrylic polymer is acrylic polymer fine particles, and the volume average particle size of the acrylic polymer line particles is 300 nm or more.

3. A plastisol comprising the acrylic polymer according to claim 1 and a plasticizer.

4. A textile ink comprising the plastisol according to claim 3.

* * * * *